United States Patent
Lynch et al.

(10) Patent No.: US 11,663,251 B2
(45) Date of Patent: May 30, 2023

(54) QUESTION ANSWERING APPROACH TO SEMANTIC PARSING OF MATHEMATICAL FORMULAS

(71) Applicant: International Business Machines Corporation, Armonk, NY (US)

(72) Inventors: William Karol Lynch, Rathkeale (IE); Kavitha Srinivas, Port Chester, NY (US); Horst Cornelius Samulowitz, Armonk, NY (US); Fabio Lorenzi, Tyrrelstown (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/447,126

(22) Filed: Sep. 8, 2021

(65) Prior Publication Data

US 2023/0076089 A1   Mar. 9, 2023

(51) Int. Cl.
*G06F 16/335* (2019.01)
*G06V 30/416* (2022.01)
*G06F 40/205* (2020.01)
*G06F 16/332* (2019.01)

(52) U.S. Cl.
CPC ........ *G06F 16/3329* (2019.01); *G06F 16/335* (2019.01); *G06V 30/416* (2022.01); *G06F 40/205* (2020.01)

(58) Field of Classification Search
None
See application file for complete search history.

(56) References Cited

U.S. PATENT DOCUMENTS

| | | | |
|---|---|---|---|
| 10,169,327 B2 | 1/2019 | Allen et al. | |
| 10,275,454 B2 | 4/2019 | Chowdhury et al. | |
| 10,769,185 B2 | 9/2020 | Bradley et al. | |
| 10,902,038 B2 | 1/2021 | Brown et al. | |
| 2020/0183928 A1* | 6/2020 | Wu | G06F 16/335 |

OTHER PUBLICATIONS

Schubotz et al., "Semantification of Identifiers in Mathematics for Better Math Information Retrieval," https://www.researchgate.net/publication/305081380_Semantification_of_Identifiers_in_Mathematics_for_Better_Math_Information_Retrieval/link/5a03ee5daca272b06ca69de3/download, SIGIR '16, Jul. 17-21, 2016.*
Anonymous, "Automatic, In-Domain, Question/Answer-Set Generation," an IP.com Prior Art Database Technical Disclosure, IPCOM000245124D, Feb. 10, 2016, 5 pgs.

(Continued)

*Primary Examiner* — Kannan Shanmugasundaram
(74) *Attorney, Agent, or Firm* — Kelsey M. Skodje

(57) ABSTRACT

A method, system, and computer program product are disclosed. The method includes extracting at least one identifier from a formula in a document and extracting text passages in the document that contain the identifier(s). The method also includes selecting an identifier and extracted text passages containing the identifier, as well as generating identifier-passage pairs for the selected text passages and the identifier. Further, the method includes submitting the identifier-passage pairs to a question answering (QA) model, which generates candidate answers from the selected text passages. A definition of the identifier is then selected from the candidate answers.

20 Claims, 5 Drawing Sheets

(56) References Cited

OTHER PUBLICATIONS

Anonymous, "Data-Driven Long-Tail Candidate Answer Generation in a Question Answering Machine," an IP.com Prior Art Database Technical Disclosure, IPCOM000263113D, Jul. 30, 2020, 4 pgs.

Anonymous, "Treating Dates Differently in QA Systems," an IP.com Prior Art Database Technical Disclosure, IPCOM000250305D, Jun. 26, 2017, 3 pgs.

Anonymous, "A self-diagnosing question answering system," an IP.com Prior Art Database Technical Disclosure, IPCOM000247244D, Aug. 17, 2016, 6 pgs.

Bengio et al., "Representation Learning: A Review and New Perspectives," arXiv:1206.5538v3 [cs.LG] Apr. 23, 2014, 30 pgs.

Clark et al., "Simple and effective multi-paragraph reading comprehension," https://www.semanticscholar.org/paper/Simple-and-Effective-Multi-Paragraph-Reading-Clark-Gardner/3c78c6df5eb1695b6a399e346dde880af27d1016, DOI:10.18653/v1/P18-1078Corpus ID: 223637, Proceedings of the 56th Annual Meeting of the Association for Computational Linguistics (Long Papers), pp. 845-855, © 2018 Association for Computational Linguistics.

Khurana et al., "Feature Engineering for Predictive Modeling Using Reinforcement Learning," https://ojs.aaai.org/index php/AAAI/article/view/11678, Proceedings of the Thirty-Second AAAI Conference on Artificial Intelligence, New Orleans, Louisiana, USA, Feb. 2-7, 2018, 8 pgs.

Lam et al., "One button machine for automating feature engineering in relational databases," https://arxiv.org/abs/1706.00327v1 [cs.DB], Jun. 1, 2017, 9 pgs.

Lynch, et al., "Methods and Systems for Automated Feature Generation Utilizing Formula Semantification," U.S. Appl. No. 16/659,249, filed Oct. 21, 2019.

Mell et al., "The NIST Definition of Cloud Computing," Recommendations of the National Institute of Standards and Technology, U.S. Department of Commerce, Special Publication 800-145, Sep. 2011, 7 pgs.

Patra et al., "Understanding Complex Multi-sentence Entity seeking Questions," © 2019 Association for the Advancement of Artificial Intelligence, 10 pgs.

Proceedings of the AAAI 2019 Workshop (WS13) on Reasoning and Complex Question-Answering (RCQA-19), Jan. 27-Feb. 1, 2019, 67 pgs.

Schubotz et al., "Introducing MathQA—A Math-Aware Question Answering System," arXiv:1907.01642v1 [cs.IR] Jun. 28, 2019, 11 pgs.

Schubotz et al., "Semantification of Identifiers in Mathematics for Better Math Information Retrieval," https://www.researchgate.net/publication/305081380_Semantification_of_Identifiers_in_Mathematics_for_Better_Math_Information_Retrieval/link/5a03ee5daca272b06ca69de3/download, SIGIR '16, Jul. 17-21, 2016, Pisa, Italty, © 2016 ACM, 12 pgs.

Wang et al., "Multi-passage BERT: A Globally Normalized BERT Model for Open-domain Question Answering," https://arxiv.org/abs/1908.08167v2 [cs CL] Oct. 2, 2019, 5 pgs.

\* cited by examiner

QUESTION ANSWERING APPROACH TO SEMANTIC PARSING OF MATHEMATICAL FORMULAS

BACKGROUND

The present disclosure relates to automated feature engineering and, more specifically, to extracting features from documents containing natural language text and mathematical formulas.

Automated feature engineering (AFE) is used in machine learning to discover useful features programmatically, rather than have them manually selected by a data scientist or domain expert. AFE techniques can use search based techniques across a feature space. For example, features may be extracted using the application of a mathematical transformation to one or more input column combinations in order to generate a candidate feature, followed by a test to determine if this candidate feature is useful for the prediction/classification task at hand.

SUMMARY

Various embodiments are directed to a method, which includes extracting at least one identifier from a formula in a document and extracting text passages in the document that contain the identifier(s). In some embodiments, the formula includes mathematical objects in structured tags. The method also includes selecting an identifier and extracted text passages containing the identifier, as well as generating identifier-passage pairs for the selected text passages and the identifier. Further, the method includes submitting the identifier-passage pairs to a question answering (QA) model, which generates candidate answers from the selected text passages. In some embodiments, the QA model includes a reading comprehension model. Generating the candidate answers can include submitting parameterized queries weighted based on an identifier context. A definition of the identifier is then selected from the candidate answers. The method can also include generating confidence scores for the candidate answers. In some embodiments, the candidate answers are ranked based on these confidence scores, and the highest ranking candidate answer is selected as the definition. Additionally, the method can include generating confidence scores for the candidate answers and the text passages. In these instances, the confidence scores can be used to rank the answers and the text passages, and the highest ranking candidate answer can be selected from the highest ranking text passage.

Further embodiments are directed to a system, which includes a memory and a processor communicatively coupled to the memory, wherein the processor is configured to perform the method. Additional embodiments are directed to a computer program product, which includes a computer readable storage medium having program instructions embodied therewith, the program instructions executable by a processor to cause a device to perform the method.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

Figure 1:
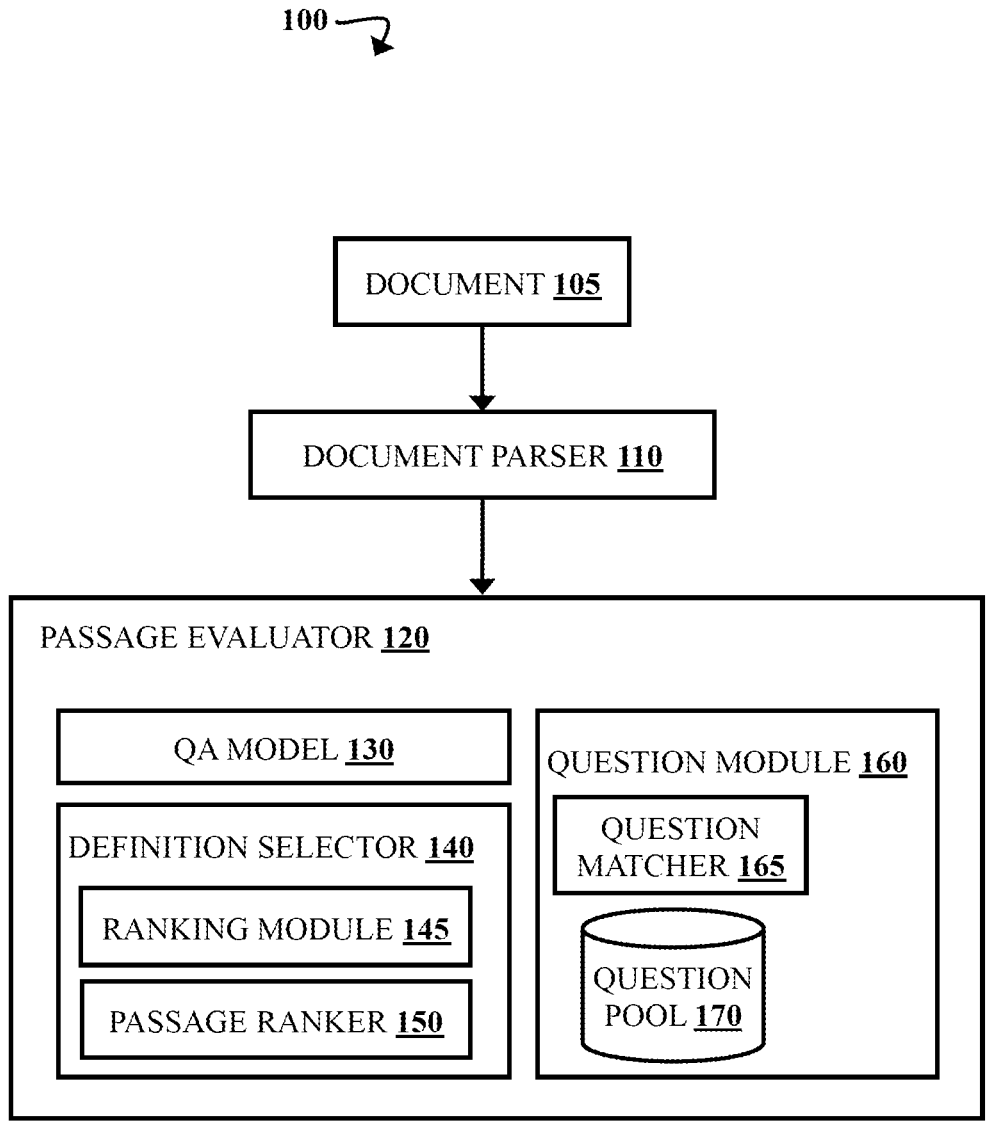
FIG. 1 is a block diagram illustrating a document parsing environment, according to some embodiments of the present disclosure.

Aspects of the present disclosure relate generally to the field of automated feature engineering, and in particular to extracting features from documents containing natural language text and mathematical formulas. While the present disclosure is not necessarily limited to such applications, various aspects of the disclosure may be appreciated through a discussion of various examples using this context.

Machine learning techniques can be used to extract and process information from text documents. For example, entities and relationships identified in a document can be added to text corpora, used to generate a document summary, etc. Automated feature engineering (AFE) is a technique used to discover useful features across a feature space programmatically, rather than have them manually selected by a data scientist or domain expert. AFE can include the application of a mathematical transformation to one or more input column combinations in order to generate a candidate feature, followed by a test to determine if this candidate feature is useful for the prediction/classification task at hand. Approaches that may be used to guide feature searches can include mathematical optimization and leveraging domain knowledge.

Additional transformations may lead to the automated discovery of additional features. Incorporating transformation discovery into AFE applications may be beneficial in expanding on a set of core transformations contained within an AFE application. For example, mathematical transformations could be automatically extracted from documents. Mathematical formulas are often a concise representation of key information in an article and are frequently used to calculate solutions for business and engineering problems. Thus, semantic mathematical formula understanding can be an important subtask of document understanding. Combining semantic mathematical formula understanding with automatic code generation capabilities can allow combinations of features such as automatically finding relevant formulas for a problem of interest and automatically generating executable code for the relevant formulas.

However, feature engineering is widely reported as being one of the most labor-intensive steps in machine learning. Additionally, existing techniques for extracting definitions of identifiers from formulas can rely on assumptions that frequently lead to errors. These can include assuming definitions of identifiers such as mathematical symbols will be noun phrases or that definitions will be in the same sentence as the symbols. These assumptions can introduce errors because existing methods often fail to correctly tag all noun phrases and to correctly split a text into sentences. Therefore, improved techniques for semantic parsing of mathematical formulas are of interest.

Disclosed herein are techniques for determining semantic meaning from mathematical formulas and natural language text in a document using a question answering (QA) approach. Symbols/identifiers can be extracted from formulas in a document, and text passages containing these formulas can be extracted from the text portion of the document. Identifier-text passage pairs can be submitted to a QA model, which generates candidate answers. A definition of an identifier can then be selected from these candidate answers. The disclosed techniques can use pre-trained language/reading comprehension models, which can be fine-tuned with task-specific examples. The disclosed techniques can also offer advantages over existing techniques because they do not rely on error-causing assumptions of existing techniques. Additionally, the disclosed techniques can be used across different source formats, thereby facilitating the benefits of transfer learning.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 is a block diagram illustrating a document parsing environment 100, according to some embodiments of the present disclosure. Environment 100 includes a document 105, a document parser 110, and a passage evaluator 120. The passage evaluator 120 includes a question-answering (QA) model 130 and a definition selector 140. The definition selector 140 can include a ranking module 145 and, optionally, a passage ranker 150. In some embodiments, the passage evaluator 120 can include a question module 160, which can include a question matcher 165 and a question pool 170.

Document 105 can be any machine-readable source of text (e.g., natural language text) and mathematical objects. Mathematical objects can include symbols and formulas. However, document 105 may include other mathematical objects such as numbers, sets, functions, expressions, geometric shapes, transformations, spaces, theorems, proofs, etc. In some embodiments, document 105 can contain non-mathematical formulas and symbols. For example, document 105 may include chemical formulas with chemical symbols defined in text passages.

In some embodiments, document 105 can be a scientific journal article, news article, Wikipedia article, textbook chapter, web page, source code, etc. Document 105 may have content related to areas such as scientific research, engineering, healthcare, economics, education, or any other topic/field that uses mathematical formulas. In some embodiments, there can be multiple documents (e.g., two different files) and/or formats. The text can be plain text or formatted text. In some embodiments, portions of document 105 can be structured, semi-structured, and/or unstructured.

Document 105 may include at least one markup language such as such as LaTeX, TeX, Hypertext Markup Language (HTML), Extensible Markup Language (XML), TeX Markup Language (TeXML), Math Markup Language (MathML), Wiki markup/Wikitext (e.g., a combination of content, custom mark-up, HTML, and metadata), etc. In some embodiments, document 105 includes structured formatting for mathematical objects. For example, if document 105 is a LaTeX document, mathematical objects can occur in structured tags such as inline tags (e.g., $ $ or \begin{math} \end{math}) and display mode tags (e.g., \[\], \begin{displaymath} \end{displaymath}, or \begin{equation} \end{equation}). If document 105 is a Wikipedia article, the document parser 110 may use a combination of XML, HTML, Wikitext, and/or LaTeX parsers, and formulas may occur within tags (e.g., <math> . . . </math> in a LaTeX dialect). In source code and notebooks (e.g., iPython Notebook), mathematical objects may be embedded inline (e.g., $ $) and extracted from code comments or text cells using a symbolic expression parser.

Document 105 may also include features such as graphical images, tables, charts, etc. In these instances, there may be a component (not shown) that can extract text and/or mathematical objects from these features via optical character recognition (OCR) or other image interpretation techniques. For example, there may be a document with natural language text and mathematical symbols that refers to a second document that includes mathematical formulas containing the symbols. Herein, both of these documents can be represented by document 105.

The document parser 110 processes document 105 and parses formulas and text therein. In some embodiments, the document parser 110 can use tools such as TeX validator and converter (Texvc), Mathoid, and SymPy to convert mathematical LaTeX objects into a structured format such as Python Objects, XML, HTML, or MathML. Additional examples of parsing techniques that may be used for text and/or mathematical formulas/objects can include pre-trained recurrent neural networks (RNNs) such as Long Short-Term Memory (LSTM) networks or Gated Recurrent Unit (GRU) networks, Hidden Markov models, statistical models, decision tree algorithms, supervised machine learning algorithms, semi-supervised machine learning algorithms, unsupervised machine learning algorithms, text mining, naïve Bayes classifiers, latent semantic indexing, etc.

Using at least one parsing technique (e.g., Texvc), the document parser 110 extracts identifiers from at least one mathematical formula ("formula") in document 105. Examples of identifiers can include symbols (e.g., letters or other symbols/characters representing variables in a formula). However, as will be understood by persons of ordinary skill, any appropriate identifier can be extracted. Additional identifiers may include numbers (e.g., mathematical constants or known values), units of measurement, etc.

The document parser 110 also selects text passages ("passages") that include the identifiers extracted from the formula(s). The passage granularity can be user-selected or preset. In some embodiments, passages can be sentences, paragraphs, clauses, etc. Passages can also be fixed lengths of text selected based on features such as a number of words, characters, sentences, etc. In some embodiments, passages can be overlapping or non-overlapping sets of 50 words, 100 words, 200 words, etc. For each passage containing a given identifier, the document parser 110 can generate an identifier-passage pair. For example, document 105 may include a formula and twenty passages P1-P20. Two identifiers X and Y may be extracted from the formula. If identifier X is found in passages P4 and P9 and identifier Y is found in passages P4 and P10, the document parser 110 can generate identifier-passage pairs<X, P4>, <X, P9>, <Y, P4>, and <Y, P10>.

The identifier-passage pairs are sent to the passage evaluator 120, which can determine the most likely definition of each identifier. The passage evaluator 120 can use a QA model 130 to generate candidate answers for defining an identifier based on corresponding paired passages. For example, each identifier-passage pair can be submitted to the QA model 130, which then generates one or more candidate answers for each pair. The QA model 130 can include a reading comprehension (RC) model such as BERT (Bidirectional Encoder Representations from Transformers), which may be trained on a general QA dataset (e.g., Stanford Question Answering Dataset (SQuAD)). However, additional techniques can be used to fine tune the QA model 130. For example, the QA model 130 can also be trained on a task-specific QA dataset.

The QA model 130 can submit at least one templatized question, such as "What does <symbol> represent?" to each passage. For example, "What does X represent?" may be used to query each passage containing the identifier X The QA model 130 can submit more than one templatized question for a given identifier in some embodiments. The templatized questions can have similar meanings but variations in form, and scores for answers to each question can be aggregated (see below). In some embodiments, the templatized questions include inverse questions that ask which identifier is associated with a specific answer. The questions may be generated by the question module 160, entered from a preset list of questions, input by a human, etc.

In some embodiments, the QA model 130 can use parameterized queries generated by the question module 160. The question module 160 can include a question pool 170 containing questions, parameterized by identifier, that query for identifier definitions from a context. Examples of these questions can include variations of templatized questions such as those described above.

The question module 160 can also include a question matcher 165, which can train a model to match the parameterized queries to identifier contexts. Any appropriate machine learning techniques can be used to generate this and other models used by the passage evaluator 120 (e.g., Random Forests (RF), Support Vector Machine (SVM), Relevance Vector Machines (RVM), Neural Networks (NN), LightGBM, XGBoost, Lasso, etc.). Human input can be used in the training phase as well in some embodiments. The context of an identifier can include text closest to the identifier in a given passage (e.g., text in the same sentence). The model can receive as input an identifier, parameterized question, and passage/full context for the identifier. A shorter identifier context can be extracted from the full context.

An identifier-context pair can be generated for each input identifier and its extracted context. A span answer defining the identifier can also be provided as a label during the training phase. The model learns which contexts are most likely to return the expected answer. Then, for identifier-context pairs corresponding to a given identifier and its identifier-passage pairs, the question matcher 165 can generate question scores indicating the likelihood of each parameterized query retrieving the correct answer/definition based on the input context. The question matcher 165 can then generate a set of weighted questions based on these scores. The QA model 130 can then query the passages containing the identifier with the set of questions.

The definition selector 140 selects identifier definitions from candidate answers generated by the QA model 130. The definition selector 140 can use a ranking module 145 to determine which of the candidate answers is most likely to correctly define an identifier. The ranking module 145 can rank candidate answers from each passage according to unnormalized confidence scores generated by the QA model 130. In some embodiments, the scores can include a "NULL answer" score indicating the confidence that the passage contains no answer. Additionally, identifiers can have more than one confidence score, each generated for an answer to a question variant. These confidence scores can be combined in order to determine the ranking of an identifier.

Referring again to example identifier X in document 105, multiple candidate answers may be generated for each of <X, P4> and <X, P9>. The ranking module 145 can then rank the candidate answers for passage P4 and the candidate answers for passage P9 based on their unnormalized confidence scores. The definition selector 140 can select the highest ranking candidate answer from each passage, or the options can be narrowed further. For example, when the question module 160 is included in environment 100, the ranking module 145 may use question score weights and the confidence scores to determine the candidate answers' likelihood of being correct.

Because the unnormalized confidence scores may not be comparable across passages, the ranking module 145 may also rank candidate answers based on the passages from which they were extracted. In these instances, the definition selector 140 can include a passage ranker 150. The passage ranker 150 can generate confidence scores for each passage and rank the passages based on the scores. The scores can be based on mathematical objects and/or natural language features of the passage. The definition selector 140 can then select the highest ranking answer candidate from the highest ranking passage. In some embodiments, the passage ranker 150 can use a generic RC model or a model tuned based on task-specific features.

For example, the passage ranker 150 can use a random forest algorithm that accepts the features of math-related passages labeled as containing or not containing a correct answer as input. Examples of features that may be selected for a given passage can include a top answer score, a NULL answer score, a number of mathematical objects in the passage, etc. Features may also include, for a given identifier in the passage, an identifier occurrence (e.g., a first, second, or third occurrence of the identifier in the whole document 105), a distance from the nearest formula that uses the identifier, a distance from the first formula that uses the identifier, etc. The definition selector 140 can then select an identifier definition based on candidate answer scores as well as passage rankings and, optionally, question scores.

Figure 2:
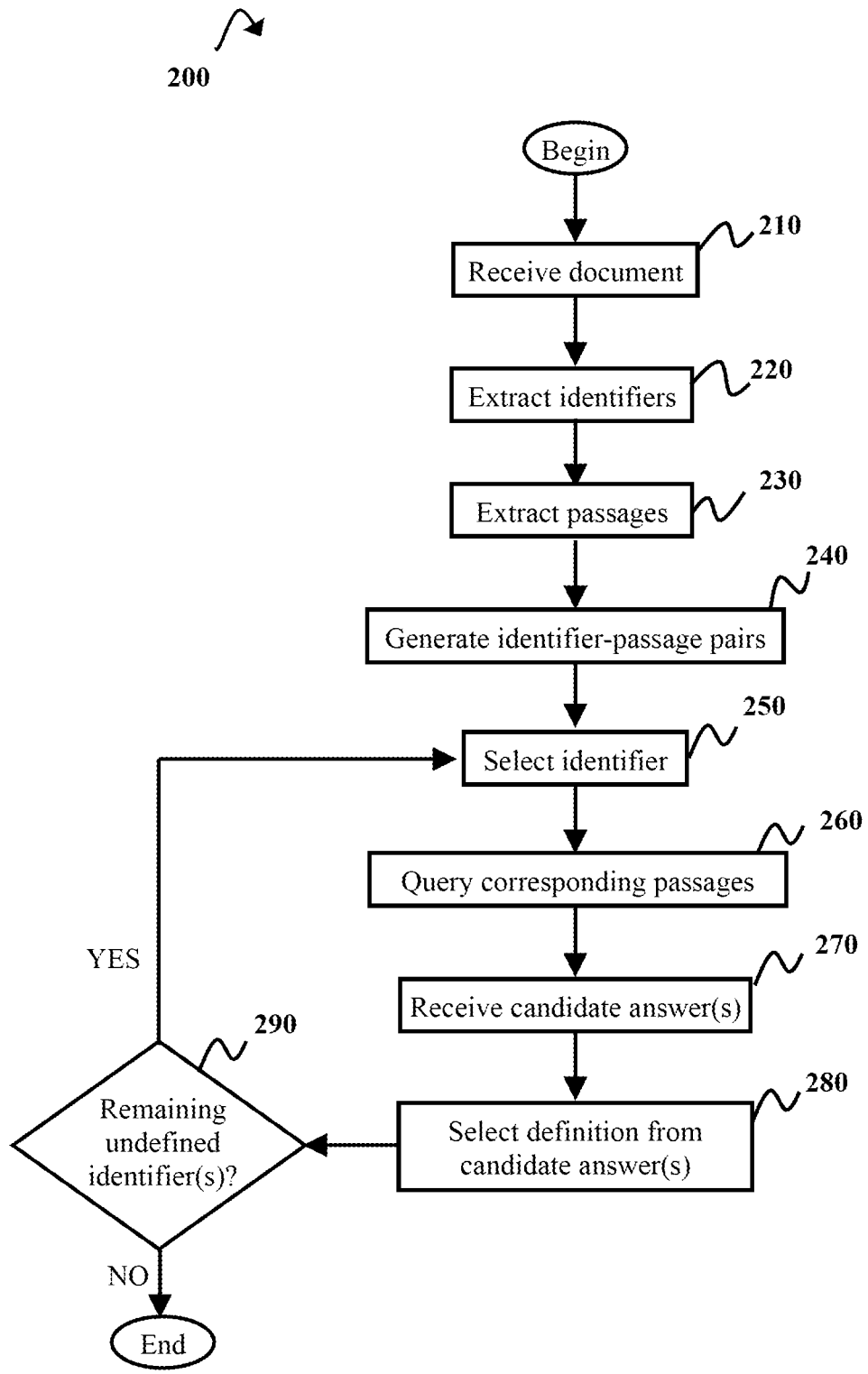
FIG. 2 is a flow diagram illustrating a process of selecting identifier definitions from a document, according to some embodiments of the present disclosure.

FIG. 2 is a flow diagram illustrating a process 200 of selecting identifier definitions from a document, according to some embodiments of the present disclosure. To illustrate process 200, but not to limit embodiments, FIG. 2 is described within the context of the information extraction environment 100 illustrated in FIG. 1. Where elements referred to in FIG. 2 are identical to elements shown in FIG. 1, the same reference numbers are used in each figure.

A document 105 is received. This is illustrated at operation 210. The document 105 can be received by the document parser 110. The document 105 can be any source of machine-readable identifiers, formulas, and text. The document 105 may be received as an image and then be converted to machine-encoded text through application of, for example, OCR, optical word recognition (OWR), intelligent character recognition (ICR), or intelligent word recognition (IWR) techniques. In some embodiments, the document includes mathematical formulas and natural language text. The formulas may have structured tags or other formatting to distinguish them from natural language text. Examples of document 105 formats are discussed in greater detail with respect to FIG. 1. Text passages in the document 105 can contain both text and mathematical object identifiers matching those extracted from mathematical formulas.

Identifiers are extracted from the document 105. This is illustrated at operation 220. The identifiers can be extracted by parsing formulas in the document 105. In some embodiments, the document parser 110 uses any parsing technique(s) appropriate for the document format. Examples of these parsing techniques are discussed in greater detail with respect to FIG. 1. The identifiers may be any objects in a formula (e.g., symbols in a mathematical formula). In a simple example, the document parser 110 may extract identifiers A, ε, b, and C from formula A=εbC. The document parser 110 may also extract the equal sign (=) but may optionally omit common symbols such as = from the list of identifiers if they are already defined (e.g., in a set of training data such as a mathematical corpus, dictionary, database, etc.).

Text passages are extracted from the document 105. This is illustrated at operation 230. The passages can be extracted by parsing text the document 105. In some embodiments, the document parser 110 parses the text using any parsing technique(s) appropriate for the document 105 format (see FIG. 1). The document parser 110 can generate a set of text passages from the document 105 (e.g., paragraphs, fixed lengths of overlapping or non-overlapping text, etc.). The document parser 110 then identifies text passages containing one or more identifiers extracted from the formulas.

Identifier-passage pairs are generated from the extracted identifiers and corresponding text passages. This is illustrated at operation 240. The document parser 110 pairs each passage containing a given identifier with that identifier. In some embodiments, the passages can contain more than one identifier. Continuing the previous example involving formula A=εbC, if three passages (P1, P2, and P3) extracted from the document 105 include identifier A, one (P3) includes identifier ε and identifier b, and two passages (P1 and P4) include C, the document parser 110 can generate three identifier-passage pairs for A (<A, P1>, <A, P2>, and <A, P3>), one identifier-passage pair for ε (<ε, P3>), one identifier passage pair for b (<b, P3>), and two identifier-passage pairs for C (<C, P1> and <C, P4>).

An identifier is selected. This is illustrated at operation 250. The identifier can be any identifier from the set of identifier-passage pairs generated at operation 230. The identifier-passage pairs for the selected identifier are sent to the passage evaluator 120. The passages containing the selected identifier can then be queried. This is illustrated at operation 260. For example, a templatized question Q (e.g., "What does <identifier> represent?") can be submitted to each passage. This can be carried out by submitting question-passage pairs to the QA model 130 (e.g., a reading comprehension (RC) model). For example, a question-passage pair for an identifier X in a passage P can be <Q_X, P> (where Q_X is "What does X represent?"). In some embodiments, the QA model 130 queries the passages with weighted parameterized queries based on context surrounding the identifier in each passage.

At least one candidate answer is received. This is illustrated at operation 270. The candidate answers are generated by the QA model 130 for each of the question-passage pairs. Each passage from the identifier-passage pairs can have one or more candidate answers. The candidate answers from each passage can have confidence scores. In some embodiments, there can be a NULL score indicating a confidence that the passage does not contain an answer.

A definition of the identifier is selected from the candidate answers. This is illustrated at operation 280. In instances where an identifier is found in only one passage, the highest ranking candidate answer for the passage can be selected as the definition of the identifier. The definition selector 140 can be used to select the definition. When there are multiple candidate answers from a passage, the ranking module 145 can rank the candidate answers based on confidence scores and select the candidate answer having the highest confidence score. If weighted parameterized queries were used at operation 260, candidate answers to highest weighted questions can be ranked more highly as well. When there are multiple passages containing the identifier, the passage ranker 150 can optionally rank the passages, and the definition selector 140 can select the highest ranking candidate answer from the highest ranking passage.

When a definition has been selected for an identifier, it can be determined whether there are remaining identifier-passage pairs with undefined identifiers. This is illustrated at operation 290. If there is at least one undefined identifier, process 200 can return to operation 250 and select a next identifier. The next identifier can be defined, and operations 250-290 can be repeated until no remaining identifiers are found at operation 290. When no remaining identifiers are found at operation 290, process 200 can end.

Figure 3:
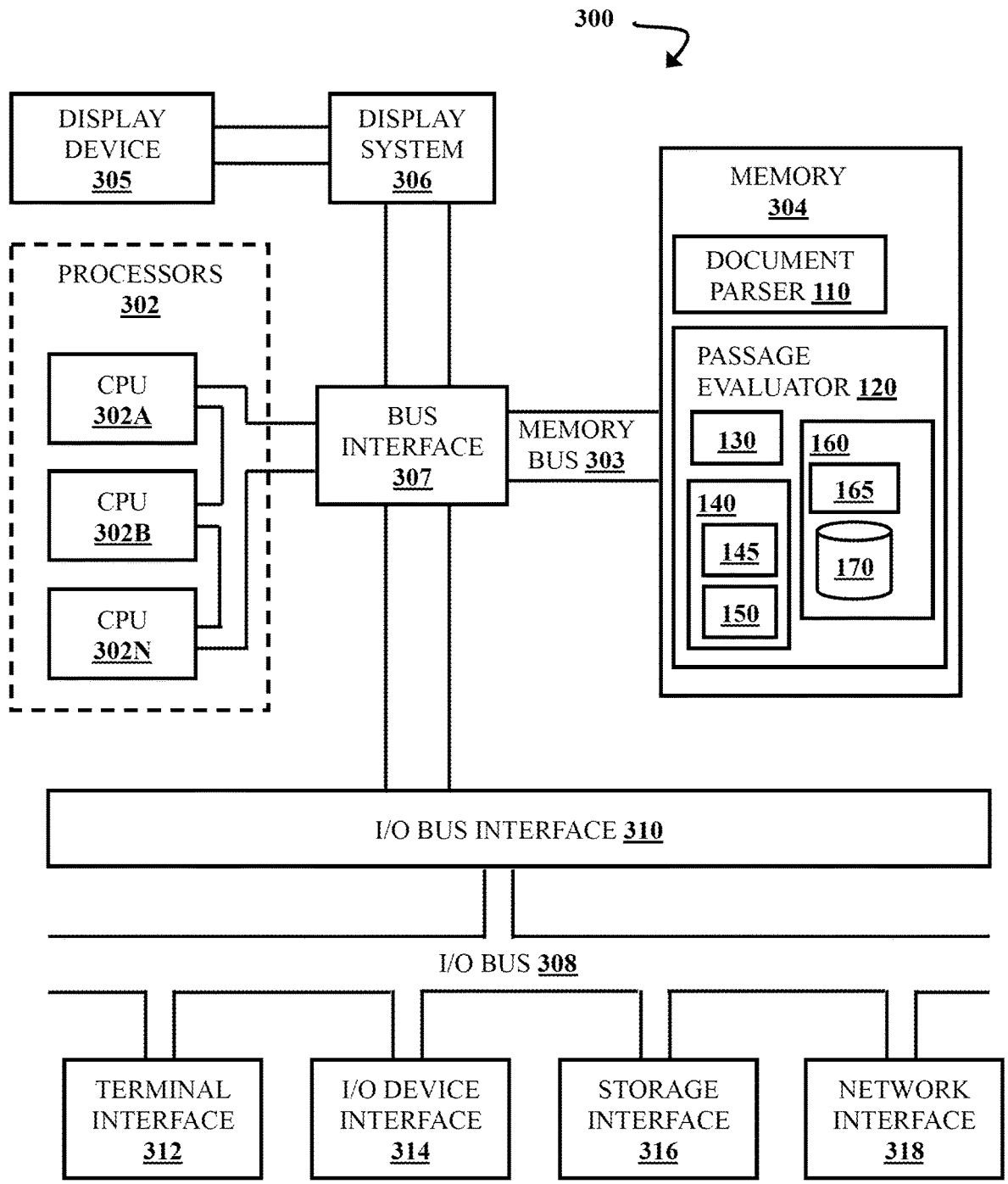
FIG. 3 is a block diagram illustrating a computer system, according to some embodiments of the present disclosure.

FIG. 3 is a block diagram illustrating an exemplary computer system 300 that can be used in implementing one or more of the methods, tools, components, and any related functions described herein (e.g., using one or more processor circuits or computer processors of the computer). In some embodiments, the major components of the computer system 300 comprise one or more processors 302, a memory subsystem 304, a terminal interface 312, a storage interface 316, an input/output device interface 314, and a network interface 318, all of which can be communicatively coupled, directly or indirectly, for inter-component communication via a memory bus 303, an input/output bus 308, bus interface unit 307, and an input/output bus interface unit 310.

The computer system 300 contains one or more general-purpose programmable central processing units (CPUs) 302A, 302B, and 302-N, herein collectively referred to as the CPU 302. In some embodiments, the computer system 300 contains multiple processors typical of a relatively large system; however, in other embodiments the computer system 300 can alternatively be a single CPU system. Each CPU 302 may execute instructions stored in the memory subsystem 304 and can include one or more levels of on-board cache.

The memory 304 can include a random-access semiconductor memory, storage device, or storage medium (either volatile or non-volatile) for storing or encoding data and programs. In some embodiments, the memory 304 represents the entire virtual memory of the computer system 300 and may also include the virtual memory of other computer systems coupled to the computer system 300 or connected via a network. The memory 304 is conceptually a single monolithic entity, but in other embodiments the memory 304 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory can be further distributed and associated with different CPUs or sets of CPUs, as is known in any of various so-called non-uniform memory access (NUMA) computer architectures.

The document parser 110, passage evaluator 120, QA model 130, definition selector 140, ranking module 145, passage ranker 150, question module 160, question matcher 165, and question pool 170 (FIG. 1), are illustrated as being included within the memory 304 in the computer system 300. However, in other embodiments, some or all of these components may be on different computer systems and may be accessed remotely, e.g., via a network. The computer system 300 may use virtual addressing mechanisms that allow the programs of the computer system 300 to behave as if they only have access to a large, single storage entity instead of access to multiple, smaller storage entities. Thus, though the document parser 110, passage evaluator 120, QA model 130, definition selector 140, ranking module 145, passage ranker 150, question module 160, question matcher 165, and question pool 170 are illustrated as being included within the memory 304, components of the memory 304 are not necessarily all completely contained in the same storage device at the same time. Further, although these components are illustrated as being separate entities, in other embodiments some of these components, portions of some of these components, or all of these components may be packaged together.

In an embodiment, the document parser 110, passage evaluator 120, QA model 130, definition selector 140, ranking module 145, passage ranker 150, question module 160, question matcher 165, and question pool 170 include instructions that execute on the processor 302 or instructions that are interpreted by instructions that execute on the processor 302 to carry out the functions as further described in this disclosure. In another embodiment, the document parser 110, passage evaluator 120, QA model 130, definition selector 140, ranking module 145, passage ranker 150, question module 160, question matcher 165, and question pool 170 are implemented in hardware via semiconductor devices, chips, logical gates, circuits, circuit cards, and/or other physical hardware devices in lieu of, or in addition to, a processor-based system. In another embodiment, the document parser 110, passage evaluator 120, QA model 130, definition selector 140, ranking module 145, passage ranker 150, question module 160, question matcher 165, and question pool 170 include data in addition to instructions.

Although the memory bus 303 is shown in FIG. 3 as a single bus structure providing a direct communication path among the CPUs 302, the memory subsystem 304, the display system 306, the bus interface 307, and the input/output bus interface 310, the memory bus 303 can, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the input/output bus interface 310 and the input/output bus 308 are shown as single respective units, the computer system 300 may, in some embodiments, contain multiple input/output bus interface units 310, multiple input/output buses 308, or both. Further, while multiple input/output interface units are shown, which separate the input/output bus 308 from various communications paths running to the various input/output devices, in other embodiments some or all of the input/output devices may be connected directly to one or more system input/output buses.

The computer system 300 may include a bus interface unit 307 to handle communications among the processor 302, the memory 304, a display system 306, and the input/output bus interface unit 310. The input/output bus interface unit 310 may be coupled with the input/output bus 308 for transferring data to and from the various input/output units. The input/output bus interface unit 310 communicates with multiple input/output interface units 312, 314, 316, and 318, which are also known as input/output processors (IOPs) or input/output adapters (IOAs), through the input/output bus 308. The display system 306 may include a display controller. The display controller may provide visual, audio, or both types of data to a display device 305. The display system 306 may be coupled with a display device 305, such as a standalone display screen, computer monitor, television, or a tablet or handheld device display. In alternate embodiments, one or more of the functions provided by the display system 306 may be on board a processor 302 integrated circuit. In addition, one or more of the functions provided by the bus interface unit 307 may be on board a processor 302 integrated circuit.

In some embodiments, the computer system 300 is a multi-user mainframe computer system, a single-user system, or a server computer or similar device that has little or no direct user interface but receives requests from other computer systems (clients). Further, in some embodiments, the computer system 300 is implemented as a desktop computer, portable computer, laptop or notebook computer, tablet computer, pocket computer, telephone, smart phone, network switches or routers, or any other appropriate type of electronic device.

It is noted that FIG. 3 is intended to depict the representative major components of an exemplary computer system 300. In some embodiments, however, individual components may have greater or lesser complexity than as represented in FIG. 3, Components other than or in addition to those shown in FIG. 3 may be present, and the number, type, and configuration of such components may vary.

In some embodiments, the data storage and retrieval processes described herein could be implemented in a cloud computing environment, which is described below with respect to FIGS. 4 and 5. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher-level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
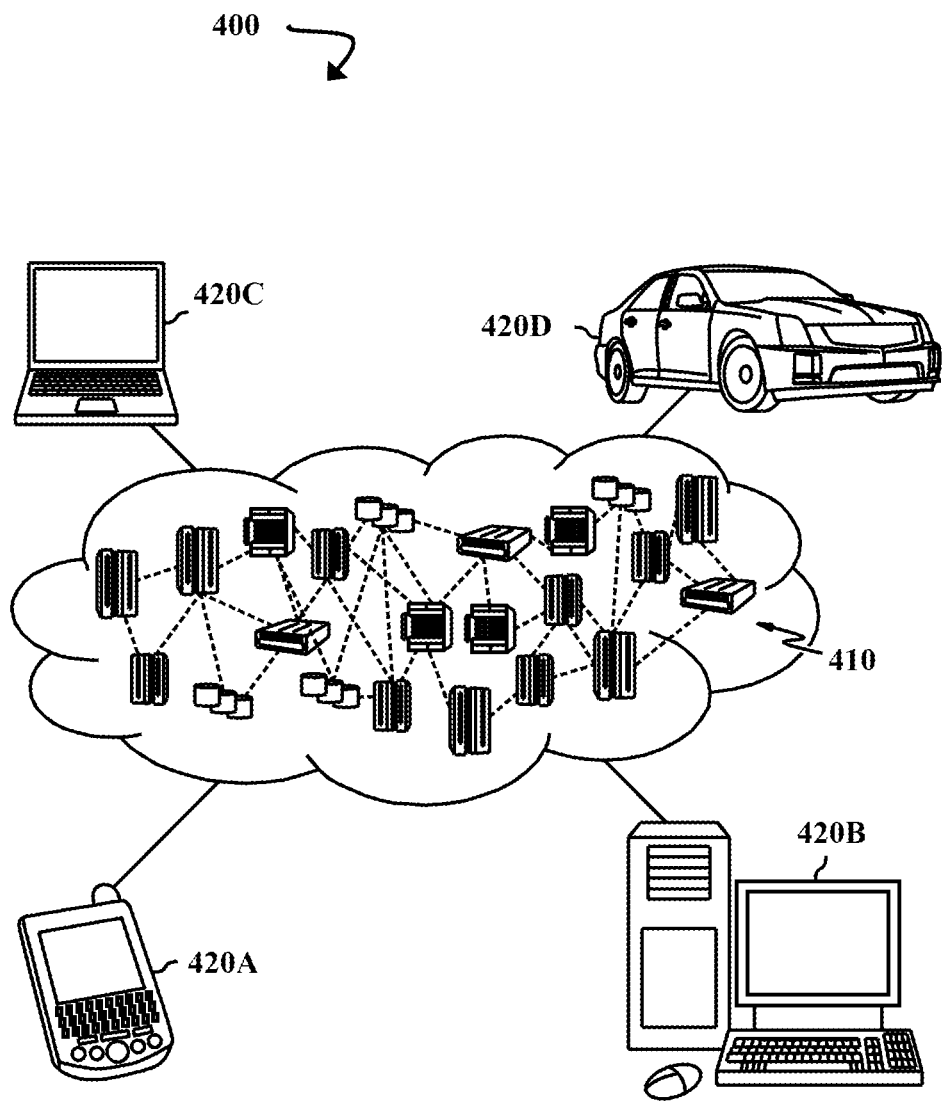
FIG. 4 is a block diagram illustrating a cloud computing environment, according to some embodiments of the present disclosure.

FIG. 4 is a block diagram illustrating a cloud computing environment 400, according to some embodiments of the present disclosure. As shown, cloud computing environment 400 includes one or more cloud computing nodes 410 with which local computing devices used by cloud consumers, such as, for example, personal digital assistant (PDA) or cellular telephone 420A, desktop computer 420B, laptop computer 420C, and/or automobile computer system 420D may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 420A—420D shown in FIG. 4 are intended to be illustrative only and that computing nodes 410 and cloud computing environment 400 can communicate with any type of computerized device over any type of network and/or network addressable connection (e.g., using a web browser).

Figure 5:
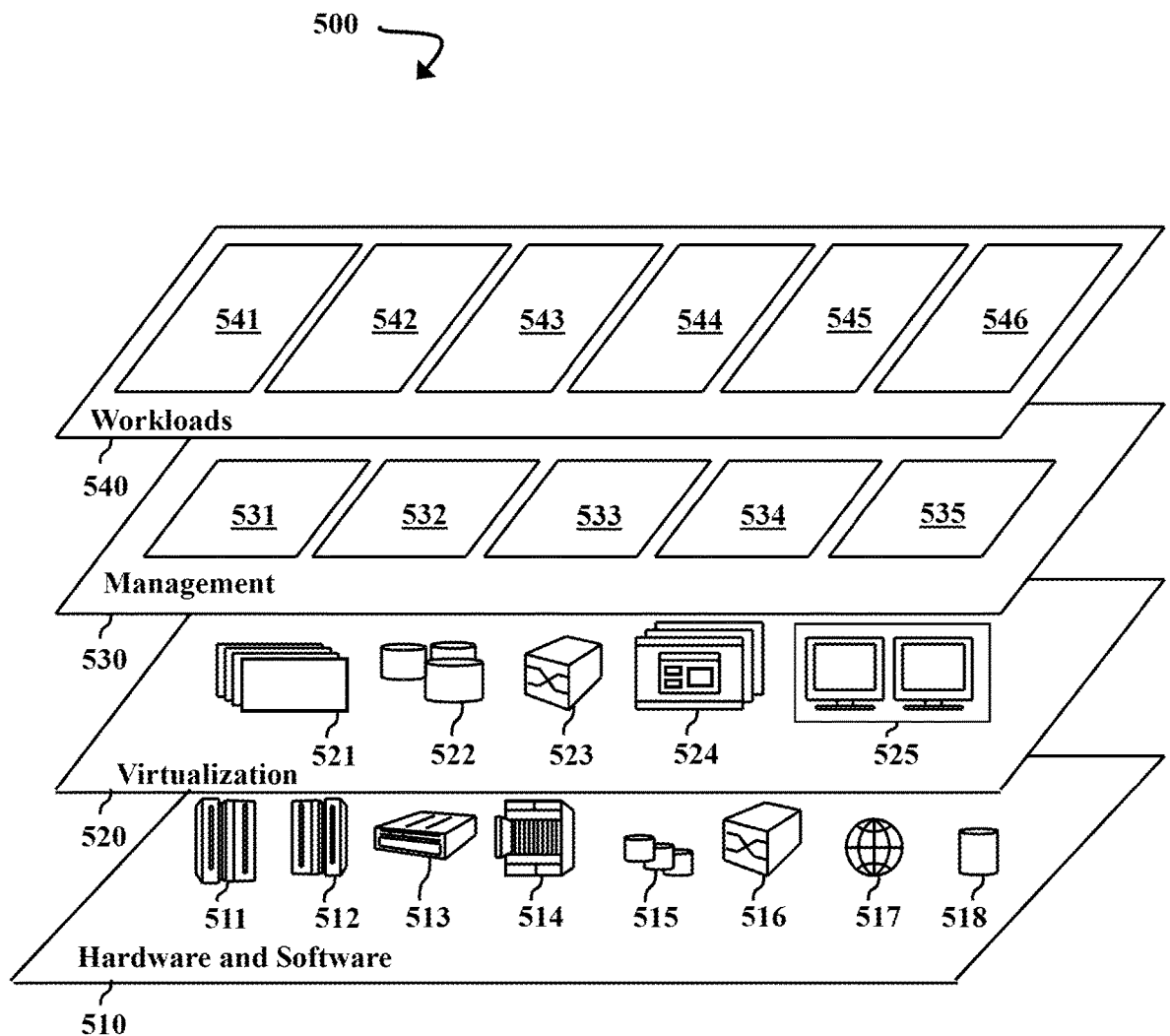
FIG. 5 is a block diagram illustrating a set of functional abstraction model layers provided by the cloud computing environment, according to some embodiments of the present disclosure.

FIG. 5 is a block diagram illustrating a set of functional abstraction model layers 500 provided by the cloud computing environment 400, according to some embodiments of the present disclosure. It should be understood in advance that the components, layers, and functions shown in FIG. 5 are intended to be illustrative only and embodiments of the invention are not limited thereto. As depicted, the following layers and corresponding functions are provided:

Hardware and software layer 510 includes hardware and software components. Examples of hardware components include: mainframes 511; RISC (Reduced Instruction Set Computer) architecture-based servers 512; servers 513; blade servers 514; storage devices 515; and networks and networking components 516. In some embodiments, software components include network application server software 517 and database software 518.

Virtualization layer 520 provides an abstraction layer from which the following examples of virtual entities may be provided: virtual servers 521; virtual storage 522; virtual networks 523, including virtual private networks; virtual applications and operating systems 524; and virtual clients 525.

In one example, management layer 530 provides the functions described below. Resource provisioning 531 provides dynamic procurement of computing resources and other resources that are utilized to perform tasks within the cloud computing environment. Metering and Pricing 532 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 533 provides access to the cloud computing environment for consumers and system administrators. Service level management 534 provides cloud computing resource allocation and management such that required service levels are met. Service Level Agreement (SLA) planning and fulfillment 535 provide pre-arrangement for, and procurement of, cloud computing resources for which a future requirement is anticipated in accordance with an SLA.

Workloads layer 540 provides examples of functionality for which the cloud computing environment can be utilized. Examples of workloads and functions that can be provided from this layer include: mapping and navigation 541; software development and lifecycle management 542; virtual classroom education delivery 543; data analytics processing 544; transaction processing 545; and semantic parsing of mathematical formulas and text 546.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the present disclosure.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof.

In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, and item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; ten of item C; four of item B and seven of item C; or other suitable combinations.

What is claimed is:

1. A method, comprising:
   training a question matching model, wherein the training comprises:
      receiving a set of labelled identifiers and corresponding contexts;
      generating, in response to a set of questions, candidate definitions of the labelled identifiers based on the corresponding contexts; and
      for each of the corresponding contexts, ranking the set of questions based on accuracy of the candidate definitions; and
   extracting an identifier from a formula in a document;
   extracting a context for the identifier from text passages in the document that contain the at least one identifier;
   by the question matching model, selecting a question from the set of questions based on the extracted context;
   submitting the selected question, the identifier, and the extracted context to a question answering (QA) model;
   receiving, from the QA model in response to the submitting, candidate answers to the first question from the selected text passages; and
   selecting a definition of the first identifier from the candidate answers.

2. The method of claim 1, further comprising generating confidence scores for the candidate answers.

3. The method of claim 2, wherein the selecting the definition comprises:
   ranking the candidate answers based on the confidence scores; and
   selecting a highest ranking candidate answer.

4. The method of claim 1, further comprising:
   generating a first set of confidence scores for the candidate answers; and
   generating a second set of confidence scores for the selected text passages.

5. The method of claim 4, wherein the selecting the definition comprises:
   ranking the candidate answers based on the first set of confidence scores;
   ranking the selected text passages based on the second set of confidence scores; and
   selecting a highest ranked candidate answer from a highest ranked text passage.

6. The method of claim 1, wherein the QA model comprises a reading comprehension model.

7. The method of claim 1, wherein the submitting the question-passage pairs comprises submitting parameterized queries weighted based on a context of the first identifier.

8. The method of claim 1, wherein the formula comprises mathematical objects in structured tags.

9. A system, comprising:
   a memory; and
   a processor communicatively coupled to the memory, wherein the processor is configured to perform a method comprising:
      training a question matching model, wherein the training comprises:
         receiving a set of labelled identifiers and corresponding contexts;
         generating, in response to a set of questions, candidate definitions of the labelled identifiers based on the corresponding contexts; and for each of the corresponding contexts, ranking the set of questions based on accuracy of the candidate definitions; and extracting an identifier from a formula in a document;

extracting text passages in the document that contain the identifier;

extracting a context for the identifier from text passages in the document that contain the at least one identifier;

by the question matching model, selecting a question from the set of questions based on the extracted context;

submitting the selected question, the identifier, and the extracted context to a question answering (QA) model;

receiving, from the QA model in response to the submitting, candidate answers to the first question from the selected text passages; and selecting a definition of the identifier from the candidate answers.

10. The system of claim 9, wherein the method further comprises generating confidence scores for the candidate answers.

11. The system of claim 10, wherein the selecting the definition comprises:
ranking the candidate answers based on the confidence scores; and
selecting a highest ranking candidate answer.

12. The system of claim 9, wherein the method further comprises:
generating a first set of confidence scores for the candidate answers; and
generating a second set of confidence scores for the selected text passages.

13. The system of claim 12, wherein the selecting the definition comprises:
ranking the candidate answers based on the first set of confidence scores;
ranking the selected text passages based on the second set of confidence scores; and
selecting a highest ranked candidate answer from a highest ranked text passage.

14. The system of claim 9, wherein the submitting the selected question generating the candidate answers comprises submitting parameterized queries weighted based on a context of the first identifier.

15. A computer program product, the computer program product comprising a computer readable storage medium having program instructions embodied therewith, the program instructions executable by a processor to cause a device to perform a method, the method comprising:
training a question matching model, wherein the training comprises:
receiving a set of labelled identifiers and corresponding contexts;
generating, in response to a set of questions, candidate definitions of the labelled identifiers based on the corresponding contexts; and
for each of the corresponding contexts, ranking the set of questions based on accuracy of the candidate definitions; and extracting an identifier from a formula in a document;

extracting a context for the identifier from text passages in the document that contain the at least one identifier;

by the question matching model, selecting a question from the set of questions based on the extracted context;

submitting the selected question, the identifier, and the extracted context to a question answering (QA) model;

receiving, from the QA model in response to the submitting, candidate answers to the first question from the selected text passages; and selecting a definition of the identifier from the candidate answers.

16. The computer program product of claim 15, wherein the method further comprises generating confidence scores for the candidate answers.

17. The computer program product of claim 16, wherein selecting the definition comprises:
ranking the candidate answers based on the confidence scores; and
selecting a highest ranking candidate answer.

18. The computer program product of claim 15, wherein the method further comprises:
generating a first set of confidence scores for the candidate answers; and
generating a second set of confidence scores for the selected text passages.

19. The computer program product of claim 18, wherein selecting the definition comprises:
ranking the candidate answers based on the first set of confidence scores;
ranking the selected text passages based on the second set of confidence scores; and
selecting a highest ranked candidate answer from a highest ranked text passage.

20. The computer program product of claim 15, wherein the submitting the selected question comprises submitting parameterized queries weighted based on a context of the first identifier.

* * * * *